United States Patent [19]
Evans

[11] 3,940,871
[45] Mar. 2, 1976

[54] TROLLING SINKER

[76] Inventor: William E. Evans, 524 N. 28th St., Milwaukee, Wis. 53208

[22] Filed: May 13, 1974

[21] Appl. No.: 469,175

[52] U.S. Cl. .............................. 43/43.13; 43/44.97
[51] Int. Cl.² ........................................... A01K 91/00
[58] Field of Search ............ 43/43.13, 42.22, 42.37, 43/42.47, 42.48, 43.1, 42.36, 42.27, 42, 42.39, 42.38, 42.45, 42.35, 42.34, 42.32, 42.45, 42.41, 42.4, 42.21, 42.09, 42.05

[56] References Cited
UNITED STATES PATENTS

| | | | |
|---|---|---|---|
| 2,605,577 | 8/1952 | Waugler | 43/43.13 |
| 3,023,537 | 3/1962 | Madison | 43/43.13 |
| 3,568,355 | 3/1971 | Hassell | 43/43.14 |
| 3,568,355 | 3/1971 | Hassell | 43/43.14 |
| 3,570,167 | 3/1971 | Smith | 43/43.13 |
| 3,693,275 | 9/1972 | Craig | 43/42.39 |
| 3,753,310 | 8/1973 | Werner | 43/42.39 |

Primary Examiner—Louis G. Mancene
Assistant Examiner—Peter K. Skiff
Attorney, Agent, or Firm—Joseph P. House, Jr.

[57] ABSTRACT

An integral molded metal sinker has a streamlined body with a pair of wings and a keel fin projecting therefrom. The body has a bulbous, semi-spherical front end which tapers back smoothly to a relatively small rear end. A wire is embedded in the body and extends from the rear end to the front end thereof. Swivels are connected to opposite ends of the wire for attaching the sinker to a fishing line and to a leader. The rear swivel is near the central axis of the body, but the front swivel is substantially above the central axis of the body, thereby placing the center of gravity of the body substantially below the front swivel and tending to prevent rotation of the body. The leading edge portions of the wings are angled downwardly with respect to the rear portions to make the sinker tend to dive when it is drawn through the water. The downturned wing portions are substantially rectangular in shape to maximize their area for a given wing span and width.

7 Claims, 5 Drawing Figures

U.S. Patent   March 2, 1976   3,940,871
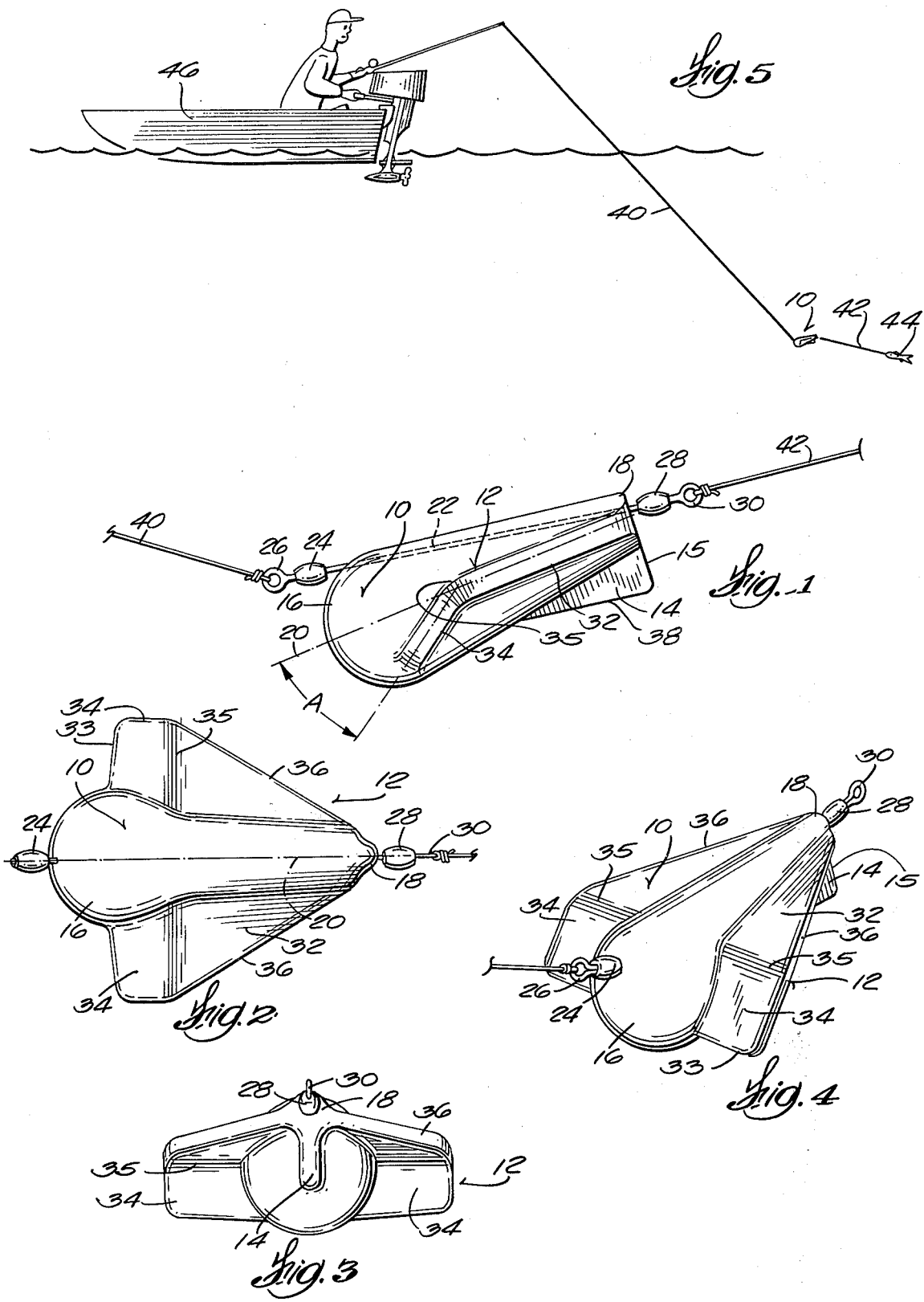

TROLLING SINKER

BACKGROUND OF THE INVENTION

Sinkers having wings and fins projecting from the body thereof are known in the prior art, as disclosed, for example, in U.S. Pat. Nos. 1,701,444; 1,320,804; 2,605,557; 2,566,029; D-174,492; 3,570,167; 3,032,912; 3,643,370; 2,883,787 and 2,789,386. However, these prior art sinkers do not achieve the advantages of my sinker and the structures thereof differ in important respects.

SUMMARY OF THE INVENTION

Trolling sinkers embodying the present invention are characterized by their relatively light weight, but deep diving and deep running capabilities notwithstanding their light weight. The sinker may be used in both fresh and salt water fishing. While designed primarily for trolling, it may also be used in still fishing. When used as a trolling sinker, various types of lures may be towed behind this sinker without affecting its performance. The sinker is tangle-free and will not overturn or twist the line in the water. The fisherman and his rod experience little pull. When a fish strikes, the sinker does not interfere with the fight or action of the fish.

The aerodynamic design of the sinker causes it to dive to the proper depth which it will maintain during trolling. The hydraulic forces on the sinker body and wing surfaces are balanced at such depth to impose minimum pull on the line. The over-all size and/or weight of the sinker can be increased or decreased, without change in its shape, depending on the desired trolling depth.

In structure, the wings and fin are desirably integrally joined to the body by being integrally molded therewith in a common mold. This reduces the cost of the sinker and increases the strength of the joint between the wings and fin and the body. Various metals can be used, depending on the desired weight. Aluminum and lead are examples of light and heavy metals which can be used. The body, wings and fin are streamlined to reduce drag. The leading edge portions of the wings are angled downwardly with respect to the rear portions to make the sinker tend to dive when it is drawn through the water. The downturned wing portions are substantially rectangular in shape to maximize their area for any given wing span and width. The wings are continuous through their intermediate bent positions.

Other objects, features and advantages of the invention will appear from this disclosure.

DESCRIPTION OF THE DRAWINGS

FIG. 1 is a side view of one embodiment of the invention being drawn through the water.

FIG. 2 is a top view of the embodiment shown in FIG. 1.

FIG. 3 is a rear end view of the embodiment of FIG. 1.

FIG. 4 is a front perspective view of the embodiment shown in FIG. 1.

FIG. 5 is a side view of the embodiment shown in FIG. 1, in use.

DESCRIPTION OF THE PREFERRED EMBODIMENT

Although the disclosure hereof is detailed and exact to enable those skilled in the art to practice the invention, the physical embodiments herein disclosed merely exemplify the invention which may be embodied in other specific structure. The scope of the invention is defined in the claims appended hereto.

The illustrated embodiment is an integrally molded metal sinker having a rearwardly tapered cone-shaped body 10 with two wings 12 projecting laterally therefrom and a rearwardly disposed keel fin 14 projecting downwardly therefrom. Wings 12 extend in a fore and aft direction for almost the entire length of body 10. Keel fin 14 extends in a fore and aft direction for only about one-half the length of the body 10. The sinker is desirably cast of any suitable metal, such as lead, babbit, aluminum, or the like, and may be made in a variety of sizes and weights. In weights from one-half ounce up, the sinker is preferably made of a heavy metal such as lead, but in weights from one-half ounce down, the sinker is preferably made of light metal such as aluminum. The integrally cast structure of this invention is an important feature because it reduces the cost of the sinker with respect to prior art sinkers and increases the strength of the joints between the body, wings and fin.

The cone-shaped body 10 has a bulbous, semi-spherical front end 16 and tapers smoothly from front end 16 to a relatively small rear end 18. The central axis 20 of body 10 passes through the center of the front end 16 and the center of rear end 18. Wire 22 is offset upwardly from axis 20 and passes from front end 16 and rear end 18. Wire 22 is embedded in body 10 projects from front end 16 and rear end 18. A front swivel 24 having an eye 26 is attached to the front end of wire 22 and a rear swivel 28 having an eye 30 is attached to the rear end of wire 22. Rear swivel 28 is located near the central axis 20, but front swivel 24 is located substantially above the central axis 20. This places the center of gravity of the sinker substantially below front swivel 24 and helps to prevent the sinker from rotating about the wire 22 when it is drawn through the water. The fact that wing portions 12 are symmetrical on both sides of body 10, and that the keel fin 14 projects from the body also helps in preventing the sinker from rotating about wire 22.

The wings 12 include rear portions 32, which are substantially aligned with central axis 20, and front portions 34, which are angled downwardly at an angle A to rear portions 32 and central axis 20. Front wing portion 34 and rear wing portion 32 are connected on bend 35. The downwardly angled front wing portions 34 cause the sinker to tend to dive when it is drawn through the water. In the illustrated embodiment, angle A is preferably in the neighborhood of 35°, but larger or smaller angles may be employed depending on the desired diving tendency. The larger the angle A, the greater the diving tendency for any given wing area of front wing portions 34.

The front portions 34 of wings 12 are preferably substantially rectangular in shape to maximize their area and diving tendency for any given wing span and width. Their front edges 33 intersect bulb 16 near its bottom. The rear portions 32 of wings 12 are preferably substantially triangular in plan and have rearwardly tapering edges 36 which merge into the rear end 18 of body 10. This configuration streamlines the wings and reduces undesirable drag.

Keel fin 14 is triangular in shape and has a rear rudder edge 15 at the rear end 18 of body 10. Fin 14 has a bottom edge 38 which merges with the body 10 at about the mid point of body length. The bulbous front end 16 and tapered rear portion of body 10 and streamlined edge 38 of keel fin 14 also serve to reduce undesirable drag.

Accordingly, the sinker exerts minimum pull on the fishing line with minimum resistance to reeling in of a hooked fish. The streamlined shape also reduces the tendency of the sinker to snag in weeds and catch on underwater objects such as tree stumps or the like.

In use, the sinker is connected at its front swivel eye 26 to a fishing line 40 and at its rear swivel eye 30 to a leader 42 which carries a baited hook or an artificial lure 44. The fishing line 40 is typically drawn through the water by a moving fishing boat 46. The weight of the sinker and the diving tendency due to the downturned front wing portions 34 causes the sinker to dive to a depth at which the total downward force on the sinker is equal or balanced by the upward force on line 40 due to the forward motion of boat 46. The bait 44 will then be drawn through the water at this depth, which is intended to correspond to the depth at which the fish are feeding. The heavier the sinker and the larger the area of the downturned wing portions, the deeper the sinker will dive. The fisherman will normally carry an assortment of sinker sizes which correspond to the range of depths at which he intends to fish.

As the sinker is drawn through the water, the keel fin 14 keeps it on a straight course behind boat 46 and counteracts any tendency for the sinker to veer to one side or the other. If the bait 44 rotates, the rear swivel 28 takes up the rotation and prevents it from being transmitted to the sinker. As noted above, any tendency for the sinker to rotate is minimized due to the fact that its center of gravity is substantially below front swivel 24 and also due to the fact that both the front portions 34 and the rear portions 32 of wings 12 are symmetrical on both sides of body 10.

Wire 22 is optional, but desirable, for heavier sinkers. In lighter sinkers the wire 22 can be omitted and the swivels 24, 28 formed with end anchors cast into the sinker body.

I claim:

1. An integrally molded trolling sinker comprising a streamlined body with two wings and at least one fin projecting from the body, means connected to the front of the body for attachment to a fishing line, means connected to the rear of the body for attachment to a fishing leader, said body having a bulbous semi-spherical front end which tapers down to a relatively small rear end, said wings being disposed rearwardly from the bulbous front end of the body so that said bulbous front end disposes a substantial part of the weight of the sinker forwardly of the wings, the front portion of said wings being larger in area than the rear portions thereof and angled downwardly with respect to the rear portion thereof to cause the sinker to tend to dive when it is drawn through the water, the rear portion of said wings tapering rearwardly from the front portions and being disposed between the top and bottom of the body.

2. The sinker of claim 1 wherein said front portions of said wings are substantially rectangular in shape with wing tips forming substantially right angle corners whereby to maximize the area thereof for any given wing span and width, thus maximizing the diving tendency induced by the front portion of said wings.

3. The sinker of claim 2 wherein said rear portions of said wings are substantially triangular in shape to minimize unnecessary drag.

4. The sinker of claim 1 wherein said means for attachment to a fishing line is positioned above the central axis of said body whereby the weight of said body tends to prevent rotation of the body.

5. The sinker of claim 1 wherein both the fin and the wings terminate at the small rear end of the body, said wings having a greater longitudinal extent than the fin.

6. The sinker of claim 1 wherein the rear portions of said wings are substantially aligned with the central axis of said body and wherein the front portions leading edges of the downwardly inclined front portions of the wings terminate above the bottom of the body.

7. The sinker of claim 1 wherein said means for attachment to a fishing line and leader comprise a wire embedded in said body and having portions projecting from the front and rear ends of said body, a front swivel connected to the front portion of said wire, and a rear swivel connected to the rear portion of said wire.

* * * * *

UNITED STATES PATENT AND TRADEMARK OFFICE
CERTIFICATE OF CORRECTION

PATENT NO. : 3,940,871
DATED : March 2, 1976
INVENTOR(S) : William E. Evans

It is certified that error appears in the above-identified patent and that said Letters Patent are hereby corrected as shown below:

Column 4, line 35, "front portions" should be deleted

Signed and Sealed this first Day of June 1976

[SEAL]

Attest:

RUTH C. MASON
Attesting Officer

C. MARSHALL DANN
Commissioner of Patents and Trademarks